United States Patent
Budampati et al.

(10) Patent No.: US 8,107,989 B2
(45) Date of Patent: Jan. 31, 2012

(54) APPARATUS AND METHOD FOR TRANSMIT POWER CONTROL IN A WIRELESS NETWORK

(75) Inventors: Ramakrishna S. Budampati, Maple Grove, MN (US); Arun V. Mahasenan, Kerala (IN); Patrick S. Gonia, Maplewood, MN (US); Soumitri N. Kolavennu, Blaine, MN (US)

(73) Assignee: Honeywell International, Inc., Morristown, NJ (US)

( * ) Notice: Subject to any disclaimer, the term of this patent is extended or adjusted under 35 U.S.C. 154(b) by 833 days.

(21) Appl. No.: 12/183,690

(22) Filed: Jul. 31, 2008

(65) Prior Publication Data

US 2010/0029317 A1 Feb. 4, 2010

(51) Int. Cl.
- H04J 11/00 (2006.01)
- H04B 7/216 (2006.01)
- H04B 7/00 (2006.01)
- H04B 7/15 (2006.01)
- H04B 7/185 (2006.01)
- H04B 1/00 (2006.01)
- H04M 1/00 (2006.01)
- H04W 4/00 (2009.01)

(52) U.S. Cl. ..... 455/522; 455/41.2; 455/13.1; 455/11.1; 455/562.1; 455/69; 455/432.2; 370/208; 370/209; 370/335

(58) Field of Classification Search ................. 455/41.2, 455/11.1, 13.1, 562.1, 69, 432.2, 522; 370/208, 370/209, 335
See application file for complete search history.

(56) References Cited

U.S. PATENT DOCUMENTS

| 6,483,453 | B2 |  | 11/2002 | Oey et al. |
| 7,072,432 | B2 | * | 7/2006 | Belcea .......................... 375/356 |
| 7,113,745 | B2 | * | 9/2006 | Khayrallah .................. 455/41.2 |
| 7,409,197 | B2 | * | 8/2008 | Posamentier .............. 455/193.1 |
| 7,653,394 | B2 | * | 1/2010 | McMillin ...................... 455/444 |
| 7,805,207 | B2 | * | 9/2010 | El Rifai .......................... 700/42 |
| 7,852,761 | B2 | * | 12/2010 | Neugebauer .............. 370/230.1 |
| 2001/0025310 | A1 | * | 9/2001 | Krishnamurthy et al. ..... 709/223 |
| 2002/0110153 | A1 | * | 8/2002 | Tomberlin .................... 370/503 |
| 2002/0176396 | A1 |  | 11/2002 | Hammel et al. |
| 2004/0005902 | A1 | * | 1/2004 | Belcea .......................... 455/502 |
| 2004/0110475 | A1 | * | 6/2004 | Korol ............................ 455/126 |
| 2004/0184421 | A1 | * | 9/2004 | Hondo .......................... 370/329 |
| 2004/0198268 | A1 | * | 10/2004 | Rashev et al. ................ 455/126 |
| 2004/0229639 | A1 | * | 11/2004 | Meyers et al. ................ 455/522 |

(Continued)

OTHER PUBLICATIONS

Dongyan Chen et al., "Dependability Enhancement for IEEE 802.11 Wireless LAN with Redundancy Techniques," Proceedings of the 2003 International Conference on Dependable Systems and Networks, 2003, 8 pages.

(Continued)

*Primary Examiner* — Nay A Maung
*Assistant Examiner* — Bobbak Safaipour (57) ABSTRACT

A method includes repeatedly transmitting messages from a first wireless node at a transmit power. The method also includes receiving feedback from a second wireless node, where the feedback is based on a quality of reception of at least some of the messages at the second wireless node. The method further includes adjusting the transmit power of the first wireless node based on the feedback to maintain the quality of reception proximate to a setpoint. The feedback could be received from multiple second wireless nodes. The feedback could include quantized values. The quality of reception could include a bit error rate, a packet error rate, and/or a receive signal strength. The quality of reception can be determined for a sliding window associated with a subset of the transmitted messages.

21 Claims, 5 Drawing Sheets

U.S. PATENT DOCUMENTS

| | | |
|---|---|---|
| 2005/0201349 A1 | 9/2005 | Budampati |
| 2005/0281215 A1 | 12/2005 | Budampati et al. |
| 2006/0002368 A1 | 1/2006 | Budampati et al. |
| 2006/0171344 A1 | 8/2006 | Subramanian et al. |
| 2006/0171346 A1 | 8/2006 | Kolavennu et al. |
| 2006/0223451 A1* | 10/2006 | Posamentier ................. 455/73 |
| 2006/0227729 A1 | 10/2006 | Budampati et al. |
| 2006/0274644 A1 | 12/2006 | Budampati et al. |
| 2006/0274671 A1 | 12/2006 | Budampati et al. |
| 2006/0287001 A1 | 12/2006 | Budampati et al. |
| 2007/0030816 A1 | 2/2007 | Kolavennu |
| 2007/0030832 A1 | 2/2007 | Gonia et al. |
| 2007/0076638 A1 | 4/2007 | Kore et al. |
| 2007/0077941 A1 | 4/2007 | Gonia et al. |
| 2007/0087763 A1 | 4/2007 | Budampati et al. |
| 2007/0091824 A1 | 4/2007 | Budampati et al. |
| 2007/0091825 A1 | 4/2007 | Budampati et al. |
| 2007/0155423 A1 | 7/2007 | Carmody et al. |
| 2007/0248051 A1* | 10/2007 | Nagaraj et al. ................. 370/331 |
| 2007/0248232 A1 | 10/2007 | Driscoll et al. |
| 2008/0062865 A1* | 3/2008 | Neugebauer ................. 370/229 |
| 2008/0112699 A1 | 5/2008 | Huseth et al. |
| 2008/0130902 A1 | 6/2008 | Foo Kune et al. |
| 2008/0273547 A1 | 11/2008 | Phinney et al. |
| 2009/0325494 A1* | 12/2009 | Staszewski et al. ............. 455/43 |
| 2010/0103839 A1* | 4/2010 | Swenson et al. ............. 370/252 |

OTHER PUBLICATIONS

Dr. Soumitri Kolavennu, Presentation, "WNSIA MAC Layer", ISA SP100 meeting, Feb. 14, 2007, 24 pages, see esp. p. 17.

* cited by examiner

APPARATUS AND METHOD FOR TRANSMIT POWER CONTROL IN A WIRELESS NETWORK

TECHNICAL FIELD

This disclosure relates generally to wireless networks and more specifically to an apparatus and method for transmit power control in a wireless network.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities. Process control systems routinely include one or more wireless networks containing various wireless devices, such as wireless sensors and wireless actuators.

SUMMARY

This disclosure provides an apparatus and method for transmit power control in a wireless network.

In a first embodiment, a method includes repeatedly transmitting messages from a first wireless node at a transmit power. The method also includes receiving feedback from a second wireless node, where the feedback is based on a quality of reception of at least some of the messages at the second wireless node. The method further includes adjusting the transmit power of the first wireless node based on the feedback to maintain the quality of reception proximate to a setpoint.

In a second embodiment, an apparatus includes a wireless radio configured to repeatedly transmit messages at a transmit power. The wireless radio is also configured to receive feedback from a receiving node, where the feedback is based on a quality of reception of at least some of the messages at the receiving node. The apparatus also includes a controller configured to adjust the transmit power of the wireless radio based on the feedback to maintain the quality of reception proximate to a setpoint.

In a third embodiment, an apparatus includes a wireless radio configured to wirelessly receive first messages from a transmitting node. The apparatus also includes a feedback controller configured to determine a quality of reception of at least some of the received first messages and generate a second message having information identifying the quality of reception and/or information associated with the quality of reception. The wireless radio is further configured to transmit the second message to the transmitting node.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
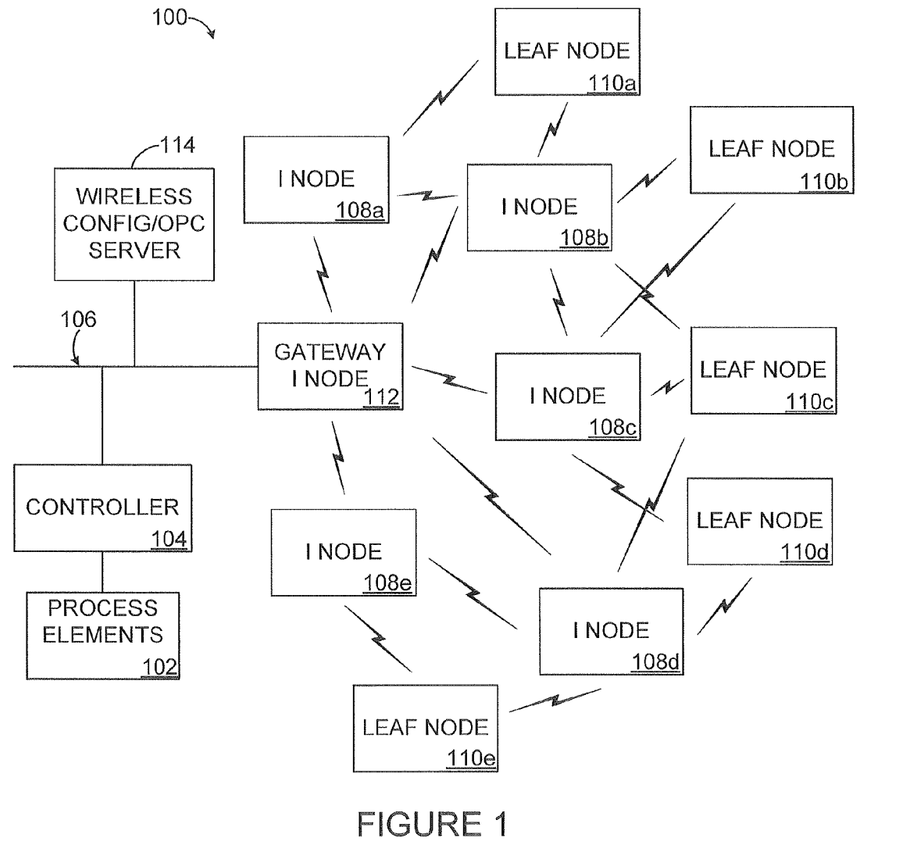
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 could be used without departing from the scope of this disclosure.

In this example embodiment, the process control system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system may represent any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks (WANs), all or a portion of a global network, or any other communication system or systems at one or more locations.

In FIG. 1, the process control system 100 also includes one or more wireless networks for communicating with wireless sensors or other devices. In this example, a wireless network includes infrastructure nodes ("I nodes") 108a-108e, leaf nodes 110a-110e, and a gateway infrastructure node 112.

The infrastructure nodes 108a-108e and the leaf nodes 110a-110e engage in wireless communications with each other. For example, the infrastructure nodes 108a-108e may receive data transmitted over the network 106 (via the node 112) and wirelessly communicate the data to the leaf nodes 110a-110e. Similarly, the leaf nodes 110a-110e may wirelessly communicate data to the infrastructure nodes 108a-108e for forwarding to the network 106 (via the node 112). In addition, the infrastructure nodes 108a-108e may wirelessly exchange data with one another. In this way, the nodes 108a-108e form a wireless network capable of providing wireless coverage to leaf nodes and other devices in a specified area, such as a large industrial complex.

In this example, the nodes 108a-108e and 110a-110e are divided into infrastructure nodes and leaf nodes. The infrastructure nodes 108a-108e typically represent line-powered devices, meaning these nodes receive operating power from an external source. Infrastructure nodes 108a-108e are typically not limited in their operations since they need not minimize power consumption to increase the operational life of their internal power supplies. On the other hand, the leaf nodes 110a-110e typically represent devices powered by local power supplies, such as nodes that receive operating power from internal batteries or other internal power supplies. Leaf nodes 110a-110e are often more limited in their operations in order to help preserve the operational life of their internal power supplies.

The nodes 108a-108e and 110a-110e include any suitable structures facilitating wireless communications, such as radio frequency (RF) frequency hopping spread spectrum (FHSS) transceivers. The nodes 108a-108e and 110a-110e could also include other functionality, such as functionality for generating or using data communicated over the wireless network. For example, the leaf nodes 110a-110e could represent wireless sensors used to measure various characteristics within an industrial facility. The sensors could collect and communicate sensor readings to the controller 104 via the node 112. The leaf nodes 110a-110e could also represent actuators that receive control signals from the controller 104 and adjust the operation of the industrial facility. In this way, the leaf nodes may include or operate in a similar manner as the process elements 102 physically connected to the controller 104. The leaf nodes 110a-110e could further represent handheld user devices (such as INTELATRAC devices from HONEYWELL INTERNATIONAL INC.), mobile stations, programmable logic controllers, or any other or additional devices.

The gateway infrastructure node 112 communicates wirelessly with, transmits data to, and receives data from one or more infrastructure nodes and possibly one or more leaf nodes. The node 112 may also convert data between protocol(s) used by the network 106 and protocol(s) used by the nodes 108a-108e and 110a-110e. For example, the node 112 could convert Ethernet-formatted data transported over the network 106 into a wireless protocol format (such as an IEEE 802.11a, 802.11b, 802.11g, 802.11n, 802.15.3, 802.15.4, or 802.16 format) used by the nodes 108a-108e and 110a-110e. The node 112 could also convert data received from one or more of the nodes 108a-108e and 110a-110e into Ethernet-formatted data for transmission over the network 106. In addition, the node 112 could support various functions, such as network creation and security, used to create and maintain a wireless network. The gateway infrastructure node 112 includes any suitable structure for facilitating communication between components or networks using different protocols.

In particular embodiments, the various nodes in the wireless network of FIG. 1 form a mesh network communicating at 2.4 GHz or 5.8 GHz. Also, in particular embodiments, data can be injected into the wireless mesh network through the infrastructure nodes, thus providing versatile, multifunctional, plant-wide coverage for wireless sensing, asset location tracking, personnel tracking, wireless communications, and any other or additional functionality as desired.

A wireless configuration and OLE for Process Control (OPC) server 114 can configure and control various aspects of the process control system 100. For example, the server 114 could configure the operation of the nodes 108a-108e and 112. The server 114 could also support security in the process control system 100, such as by distributing cryptographic keys or other security data to various components in the process control system 100 (like the nodes 108a-108e, 110a-110e, and 112). The server 114 includes any hardware, software, firmware, or combination thereof for configuring wireless networks and providing security information.

In one aspect of operation, at least some of the leaf nodes 110a-110e routinely transmit data to the infrastructure nodes 108a-108e. For example, various leaf nodes could transmit data at a specified interval, such as 0.25, 1, 5, 10, or 30 seconds. Moreover, in some embodiments, various leaf nodes could transmit data to multiple infrastructure nodes, such as a redundant pair of infrastructure nodes. As a particular example, the leaf node 110a in FIG. 1 communicates with infrastructure nodes 110a-110b, and the leaf node 110e in FIG. 1 communicates with infrastructure nodes 110d-110e. In these embodiments, a leaf node could transmit a single message, and its redundant pair of infrastructure nodes could each receive and route a copy of the message. It may be noted that the pair of infrastructure nodes communicating with a leaf node may change over time, such as when infrastructure nodes are lost or moved or when interference interrupts wireless communications.

Many process control systems simply use wireless devices that transmit at their maximum transmit power. However, the maximum transmit power is often not required to obtain a desired signal strength or a desired error rate (such as a desired bit error rate or "BER" or a desired packet error rate or "PER") at a receiving node. Also, using the maximum transmit power in one wireless device can cause interference at other wireless devices. In addition, using the maximum transmit power when not required shortens the life of internal power supplies used in the wireless device.

In accordance with this disclosure, the transmit power of wireless nodes can be adjusted to provide desired operation in the wireless network, such as by reducing the transmit power to a minimum level that maintains a desired error rate or a desired receive signal strength. For example, the leaf nodes 110a-110e could transmit some or all messages using an adaptive transmit power, where the transmit power used by a leaf node is adjusted based on feedback from its infrastructure node(s). This feedback could be based on one or more error rates of data received by an infrastructure node or one or more signal strengths of wireless signals received by an infrastructure node. If the leaf node communicates with multiple infrastructure nodes, the feedback could be based on error rates of data received by those infrastructure nodes or signal strengths of wireless signals received by those infrastructure nodes. In particular embodiments, feedback is provided from an infrastructure node to a leaf node using acknowledgements sent by the infrastructure node.

The leaf node could use the feedback from its infrastructure node(s) to adjust its transmit power. For example, the leaf node could increase its transmit power when the error rate measured at its infrastructure node(s) is too high (compared to a specified acceptable error rate) or the receive signal strength measured at its infrastructure node(s) is too low (compared to a specified acceptable signal strength). The leaf node could also decrease its transmit power when the error rate measured at its infrastructure node(s) is too low (compared to a specified acceptable error rate) or the receive signal strength measured at its infrastructure node(s) is too high (compared to a specified acceptable signal strength).

In this way, nodes in the wireless network can minimize their transmit power while maintaining an acceptable error rate (such as one that is less than or equal to a specified maximum) or an acceptable receive signal strength (such as one that is greater than or equal to a specified minimum). This enables the nodes to cause less interference with one another or other wireless devices. Also, power consumption can increase polynomially when transmit power increases, so reductions in transmit power can provide significant power savings and lengthen the life of internal power supplies in the nodes. As particular examples, adjusting the transmit power of a leaf node could help increase the life of the leaf node's internal power supply by about 5% (for nodes that transmit at a five-second interval), about 15-20% (for nodes that transmit at a one-second interval), or about 35-40% (for nodes that transmit at a quarter-second interval).

Although FIG. 1 illustrates one example of a process control system 100, various changes may be made to FIG. 1. For example, the process control system 100 could include any number of process elements, controllers, networks (wired or wireless), infrastructure nodes (gateway or other), leaf nodes, and servers. Also, the functional division shown in FIG. 1 is for illustration only. Various components in FIG. 1 could be combined, subdivided, or omitted and additional components could be added according to particular needs. In addition, FIG. 1 illustrates one example operational environment where wireless nodes' transmit power could be controlled. This functionality could be used with any suitable device or system.

Figure 2A:
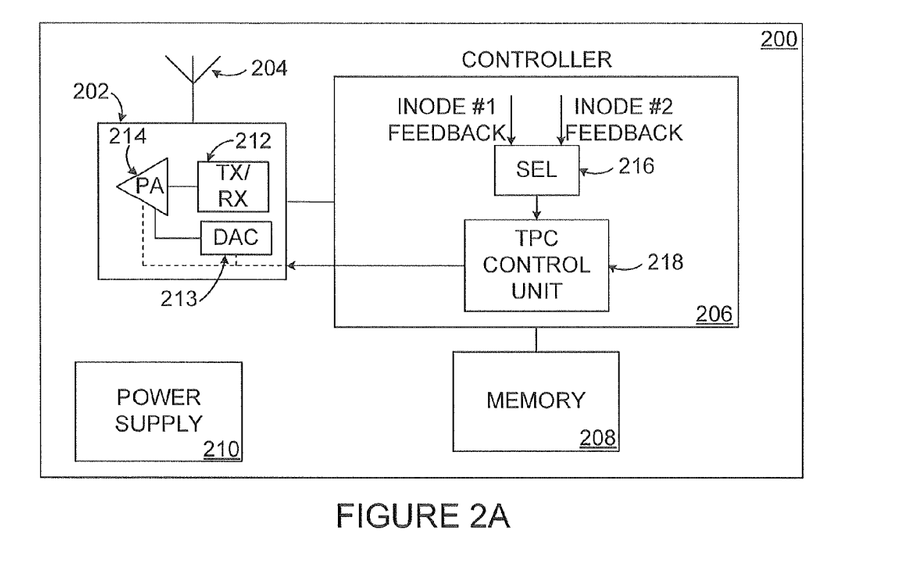
FIGS. 2A and 2B illustrate example wireless nodes in a wireless network according to this disclosure.
Figure 2B:
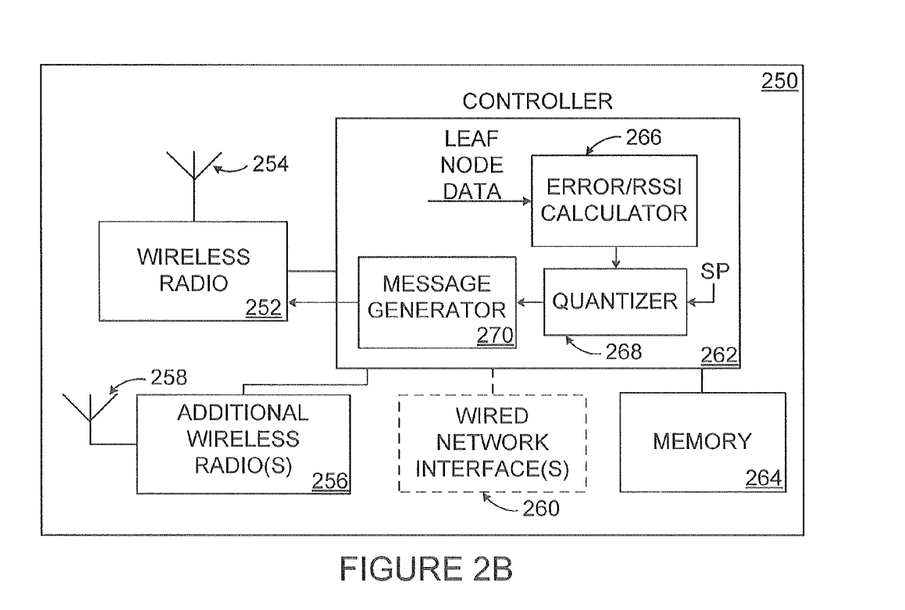

FIGS. 2A and 2B illustrate example wireless nodes in a wireless network according to this disclosure. In particular, FIG. 2A illustrates an example leaf node 200, and FIG. 2B illustrates an example infrastructure node 250. These nodes 200 and 250 could be used as the leaf nodes and infrastructure nodes, respectively, in the system 100 of FIG. 1. The embodiments of the wireless nodes shown in FIGS. 2A and 2B are for illustration only. Other embodiments of the wireless nodes could be used without departing from the scope of this disclosure.

As shown in FIG. 2A, the leaf node 200 includes a wireless radio 202 and an antenna 204. The wireless radio 202 and antenna 204 can be used to communicate wirelessly with other devices. For example, the wireless radio 202 and antenna 204 can be used to transmit information to one or more infrastructure nodes (such as to a redundant pair of infrastructure nodes) and to receive information from the one or more infrastructure nodes (such as acknowledgements). The wireless radio 202 includes any suitable structure for generating signals for wireless transmission and/or receiving signals transmitted wirelessly, such as an RF FHSS transceiver. Also, the antenna 204 includes any suitable structure for transmitting and/or receiving wireless signals, such as an RF antenna. It may be noted that any other suitable wireless signals could be used to communicate.

The leaf node 200 also includes a controller 206, which controls the overall operation of the leaf node 200. For example, the controller 206 may receive or generate data to be transmitted, and the controller 206 could provide the data to the wireless radio 202 for transmission over a wired or wireless network. The controller 206 could also receive through the wireless radio 202 data wirelessly transmitted to the leaf node 200 and use the data. As a particular example, the controller 206 in a sensor leaf node could provide sensor data for transmission, and the controller 206 in an actuator leaf node could receive and implement control signals (note that the leaf node could represent a combined sensor-actuator device). The controller 206 includes any hardware, software, firmware, or combination thereof for controlling operation of the node 200. As particular examples, the controller 206 could represent a processor, microprocessor, microcontroller, field programmable gate array, or other processing or control device.

A memory 208 is coupled to the controller 206. The memory 208 stores any of a wide variety of information used, collected, or generated by the node 200. For example, the memory 208 could store information wirelessly transmitted to the leaf node 200, data that is to be transmitted by the wireless radio 202, or instructions used by the controller 206. The memory 208 includes any suitable volatile and/or non-volatile storage and retrieval device(s).

The leaf node 200 further includes a power supply 210. The power supply 210 represents an internal or locally connected power supply that provides power to the components of the leaf node 200. The power supply 210 could represent any suitable source of power, such as a battery, a solar cell, a fuel cell, or any other local source of power.

In one aspect of operation, the wireless radio 202 broadcasts or otherwise transmits outgoing data for delivery to a destination, such as one or more infrastructure nodes. Also, the controller 206 controls the transmit power for at least some of those transmissions. Among other things, this may allow the controller 206 to reduce the leaf node's transmit power for at least some of the leaf node's transmissions.

In this example, the wireless radio 202 includes a transceiver 212, a digital-to-analog converter (DAC) 213, and a power amplifier 214. The transceiver 212 generates signals for wireless transmission, such as RF modulated signals. The transceiver 212 also receives signals transmitted wirelessly to the leaf node 200 and demodulates the signals. The transceiver 212 includes any suitable structure for transmitting and receiving signals. Note that the transceiver 212 could include a separate transmitter and receiver (with separate antennas or a shared antenna).

The digital-to-analog converter 213 receives and converts digital values into analog values. The power amplifier 214 receives and amplifies RF or other signals from the transceiver 212 that are to be transmitted by the antenna 204. The transmit power of the leaf node 200 is based on the amount of amplification provided by the power amplifier 214, and the amount of amplification provided by the power amplifier 214 is controlled by the digital-to-analog converter 213. The digital-to-analog converter 213 includes any suitable structure for converting digital signals to analog signals. As particular examples, the digital-to-analog converter 213 could represent an 8-bit or 12-bit DAC that operates with a reference voltage of 2.5V. In these embodiments, transmit powers of 0 dBm-16 dBm could correspond to 1.3V-2.0V, meaning around 28% of the DAC levels are available for representing discrete transmit powers (such as 71 transmit powers for an 8-bit DAC or 1,100 transmit powers for a 12-bit DAC). The power amplifier 214 includes any suitable structure for adjustable amplification of an RF or other signal for transmission.

The controller 206 in this example operates to (among other things) control the digital-to-analog converter 213 and/or the power amplifier 214 to control the transmit power of the leaf node 200. For example, the controller 206 could receive feedback from one or more infrastructure nodes regarding the quality of the wireless transmissions from the leaf node 200. As particular examples, the leaf node 200 could transmit data to an infrastructure node and receive acknowledgements from the infrastructure node, where the acknowledgements contain feedback. The feedback could take any suitable form, such as the error rate or error count of received data as measured by the infrastructure node or the signal strength of wireless signals received by the infrastructure node.

If the leaf node 200 is using too little transmit power, the feedback from an infrastructure node could indicate that the error rate or error count is too high or the receive signal strength is too low. The controller 206 could then increase the transmit power of the wireless radio 202. If the leaf node 200 is using too much transmit power, the feedback from an infrastructure node could indicate that the error rate or error count is too low or the receive signal strength is too high. The controller 206 could then decrease the transmit power of the wireless radio 202. In this way, the leaf node 200 can use a transmit power that varies based on feedback from one or more receivers of data that is transmitted by the leaf node 200.

In some embodiments, the feedback from an infrastructure node could include the actual error rate (such as BER or PER), actual error count (such as number of messages with errors in a window), or actual receive signal strength as measured by the infrastructure node. In other embodiments, the feedback from an infrastructure node could include a code (referred to as a transmit power control or "TPC" code) that represents the error rate, error count, or receive signal strength measured at the infrastructure node. As a particular example, the TPC code could represent a two-bit value defined as shown in Table 1.

TABLE 1

| Code word | TPC Code | Description |
|---|---|---|
| 0 | 00 | Error rate/count is much too high or receive signal strength is much too low. Increase transmit power by larger amount. |
| 1 | 01 | Error rate/count is too high or receive signal strength is too low. Increase transmit power by smaller amount. |
| 2 | 10 | Error rate/count or receive signal strength is acceptable. Maintain transmit power. |
| 3 | 11 | Error rate/count is too low or receive signal strength is too high. Decrease transmit power. |

As shown in FIG. 1, feedback from multiple infrastructure nodes is provided to a selector 216, which selects feedback from one of the infrastructure nodes for further processing. For example, if the feedback takes the form of actual error rates or error counts, the selector 216 could select the larger of the error rates or error counts. If the feedback takes the form of actual receive signal strengths, the selector 216 could select the smaller of the receive signal strengths. If the feedback takes the form of TPC codes, the selector 216 could select the TPC code indicating the worse error rate or error count or the weaker receive signal strength. The selector 216 includes any hardware, software, firmware, or combination thereof for selecting one of multiple values. Note that the selector 216 could be omitted if feedback from only one infrastructure node is received. Also, the selector 216 could perform other operations, such as averaging the feedback from multiple infrastructure nodes.

The output of the selector 216 is provided to a TPC control unit 218. The control unit 218 uses the output of the selector 216 to determine if and how to adjust the transmit power of the leaf node 200. The transmit power of the leaf node 200 could be controlled by the control unit 218 in any suitable manner.

In some embodiments, the control unit 218 could use the following formula to identify a transmit power value to be used by the wireless radio 202:

$$\text{TransmitPower}(i+1) = K_1 \times e(i) + K_2 \times \int e(t) dt. \quad (1)$$

Here, TransmitPower (i+1) denotes the transmit power value used to transmit data message i+1. Also, e(i) represents an error value (such as a fractional error rate or error count) for message i. Further, $\int e(t)dt$ denotes an integration of the error value over a specified time period (such as a 64-message sliding window). In addition, $K_1$ and $K_2$ are real numbers (such as −0.3 and −0.01, respectively), which weight the error value for the prior message and the integrated error value.

The error values (denoted e(i) and e(t)) in Equation (1) could represent the actual error rates or error counts measured by one or more infrastructure nodes and reported back to the leaf node 200. The error values in Equation (1) could also represent pre-defined or other values associated with the TPC codes received from one or more infrastructure nodes. Examples of these error values are shown in Table 2, which could represent a gain table used in the leaf node 200.

TABLE 2

| Code word | TPC Code | Error Value |
|---|---|---|
| 0 | 00 | −90 |
| 1 | 01 | −15 |
| 2 | 10 | −3 |
| 3 | 11 | +3, +6, +10, or +15 |

As shown here, the error value generally represents a non-linear transformation function. Also, the magnitude of the error value is greater when the TPC code indicates the error rate or count is too high or much too high, compared to when the TPC code indicates the error rate or count is too low. These error values can therefore cause more rapid increases in the transmit power and slower decreases in the transmit power. As a result, transmit powers are quickly adjusted when the error rate/count is too high and slowly adjusted when the error rate/count is too low. Moreover, the error value of −3 for the TPC code "10" means the transmit power of the leaf node 200 can be slightly increased even when its infrastructure nodes report that the leaf node's error rate/count is acceptable. This may allow the leaf node 200 to increase its transmit power by very small amounts to conservatively assure that the desired error rate or error count is maintained. Note that a similar non-linear transformation function could also be used with feedback based on receive signal strengths.

To reduce the operational complexity of the transmit power determination, the values of $K_1$ and $K_2$ in Equation (1) can be approximated as integers. For example, an integer value corresponding to $K_1$ (denoted $K_1'$) could be calculated as round(100*$K_1$) or round(128*$K_1$) (depending on whether Radix-100 or Radix-128 is used). Similarly, an integer value corresponding to $K_2$ (denoted $K_2'$) could be calculated as round(100*$K_2$) or round(128*$K_2$). It is also possible to replace the round function here with a ceiling function (which always rounds values up to the next integer value). In these embodiments, Equation (1) could be rewritten as one of the following formulas:

$$\text{TransmitPower}(i+1) = [K_1' \times e(i) + K_2' \times \int e(t)dt] >> 7 \quad (2)$$

$$\text{TransmitPower}(i+1) = [K_1' \times e(i) + K_2' \times \int e(t)dt]/100 \quad (3)$$

where >>7 denotes a "right shift by seven bits" operation or the equivalent of division by 128.

The determined value of TransmitPower (i+1) could then be used in any suitable manner to control the transmit power used to transmit message i+1. For example, in some embodiments, the control unit 218 determines the digital value provided to the digital-to-analog converter 213 based on knowledge of the known or estimated transmit powers associated with known digital values. In these embodiments, the control unit 218 selects the digital value that is associated with the desired transmit power value (TransmitPower(i+1)). In other words, the value output to the digital-to-analog converter 213 is a function of the value of TransmitPower(i+1), which can be expressed as f (Transmitpower (i+1)).

The selection of the digital value here could be done in any suitable manner. For example, the control unit 218 could include or have access to a look-up table that identifies digital values corresponding to different transmit power values. Once the control unit 218 identifies the desired transmit power value TransmitPower (i+1), the control unit 218 accesses the look-up table and selects the digital value corresponding to the desired transmit power value. Various techniques, such as interpolation, could be used if a digital value for the desired transmit power value is not identified in the look-up table. The control unit 218 could also use a polynomial fitted to a curve that associates digital values with transmit power values (such as a curve developed by providing digital values to the digital-to-analog converter 213 and measuring the resulting transmit powers). The desired transmit power value TransmitPower(i+1) can be used in the polynomial to identify the digital value corresponding to that transmit power value. Note that the look-up table could require more storage space, while the polynomial technique may involve floating point operations.

In other embodiments, the control unit 218 controls the digital values provided to the digital-to-analog converter 213 without reference to known or estimated associations between the digital values and the transmit powers. For example, the control unit 218 could output a value of DACValue(i+1), which could be calculated using any of the following equations:

$$\text{DACValue}(i+1) = K_1 \times e(i) + K_2 \times \int e(t) dt \quad (4)$$

$$\text{DACValue}(i+1) = [K'_1 \times e(i) + K'_2 \times \int e(t) dt] >> 7 \quad (5)$$

$$\text{DACValue}(i+1) = [K'_1 \times e(i) + K'_2 \times \int e(t) dt]/100 \quad (6)$$

In other words, the value output to the digital-to-analog converter 213 is not a function of the value of TransmitPower (i+1), but is rather simply the value of DACValue(i+1). This may or may not introduce a non-linearity into the calculations, but it eliminates the need for further processing of the TransmitPower(i+1) value.

The control unit 218 could use any other suitable technique for controlling the transmit power of a wireless node. The control unit 218 includes any hardware, software, firmware, or combination thereof for controlling the transmit power of a wireless node. The control unit 218 could, for example, represent or implement a Proportional-Integral (PI) control loop or a Proportional-Integral-Derivative (PID) control loop (the derivative function in the PID control loop could be set to zero). In particular embodiments, the control unit 218 could use multiple PI or PID control loops for different wireless channels (such as frequencies), although the number of control loops can be reduced by identifying correlated channels (channels whose behavior is correlated in some manner).

Also, when implemented using software or firmware instructions, the amount of code necessary for implementing the transmit power control functionality in the leaf node 200 could be small. For example, the leaf node 200 could have 330 bytes of instructions for the transmit power control functionality, along with 13 bytes of variable data values and 5 bytes of constant data values.

As shown in FIG. 2B, the infrastructure node 250 includes a wireless radio 252 and an antenna 254, which can be used to communicate with one or more leaf nodes. The wireless radio 252 includes any suitable structure for generating signals for wireless transmission and/or receiving signals transmitted wirelessly, such as an RF FHSS transceiver. Also, the antenna 254 includes any suitable structure for transmitting and/or receiving wireless signals, such as an RF antenna. Again, it may be noted that any other suitable wireless signals could be used to communicate and that the wireless radio 252 could include a transmitter and a separate receiver (with separate antennas or a shared antenna).

The infrastructure node 250 also includes one or more additional wireless radios 256. The additional wireless radio(s) 256 could be used to communicate with other wireless devices. For example, the additional wireless radio(s) 256 could be used to communicate with other infrastructure nodes (including gateway infrastructure nodes). The additional wireless radio(s) 256 could also be used to communicate with WiFi devices, such as wireless controllers or handheld user devices. The additional wireless radios 256 may be coupled to their own antenna(s) 258 or share one or more common antennas (such as antenna 254). Each additional wireless radio 256 includes any suitable structure for generating signals for wireless transmission and/or receiving signals transmitted wirelessly, such as an RF FHSS transceiver. Also, each antenna 258 includes any suitable structure for transmitting and/or receiving wireless signals, such as an RF antenna.

If the infrastructure node 250 represents a gateway infrastructure node, the infrastructure node 250 may further include one or more wired network interfaces 260. The wired network interfaces 260 allow the node 250 to communicate over one or more wired networks, such as the network 106. Each wired network interface 260 includes any suitable structure for transmitting and/or receiving signals over a wired network, such as an Ethernet interface.

In addition, the infrastructure node 250 includes a controller 262 and a memory 264. The controller 262 controls the overall operation of the infrastructure node 250. For example, the controller 262 could receive data transmitted wirelessly (such as from a leaf node or from another infrastructure node), determine a next hop for the data (if any), and provide the data to a wireless radio for transmission to the next hop (if any). As another example, the controller 262 in a gateway infrastructure node could receive data from a wired network and provide the data to a wireless radio for wireless transmission or receive data from a wireless radio and provide the data to the wired network interface 260. The controller 262 includes any hardware, software, firmware, or combination thereof for controlling operation of the infrastructure node 250. As particular examples, the controller 262 could represent a processor, microprocessor, microcontroller, field programmable gate array, or other processing or control device. The memory 264 stores any of a wide variety of information used, collected, or generated by the infrastructure node 250. For example, the memory 264 could store information transmitted to the infrastructure node 250, data that is to be transmitted by the infrastructure node 250, or instructions used by the controller 262. The memory 264 includes any suitable volatile and/or non-volatile storage and retrieval device(s).

As noted above, the leaf node 200 may adjust its transmit power based on feedback from one or more infrastructure nodes. In this example, the controller 262 includes various components for generating and providing that feedback to leaf nodes. For example, data from a leaf node 200 can be provided to an error/RSSI calculator 266. The error/RSSI calculator 266 determines an error rate, error count, or receive signal strength indicator (RSSI) value associated with data or signals received from the leaf node 200. For instance, the error/RSSI calculator 266 could determine the bit error rate or packet error rate for a sliding time window, such as a 64-message period or other time period (like a multiple of 16 bits). The error/RSSI calculator 266 can then output the measured error rates. In other embodiments, the error/RSSI calculator 266 could identify the number of packets or other data messages suffering from errors, and this value could be output as a packet or message error count. In yet other embodiments, the error/RSSI calculator 266 could identify the receive signal strength for wireless signals received from the leaf node, and this signal strength could be output. The error/RSSI calculator 266 includes any hardware, software, firmware, or combination thereof for identifying an amount of errors associated with received data and/or a signal strength associated with received signals.

The identified amount of errors or signal strength is provided to a quantizer 268. The quantizer 268 also receives a setpoint (SP), which represents the desired or acceptable amount of errors or signal strength for the leaf node 200. The setpoint assigned to a leaf node could be selected in any suitable manner, such as based on data provided by the leaf node or by a user. The setpoint could also be fixed or variable, such as when the error rate/error count setpoint is lower or the signal strength setpoint is higher for leaf nodes currently providing more important data. The setpoint could further be received from any suitable source, such as from a user. The node 200 could also learn about the channel and its interference and can adapt the setpoint without any user intervention. In addition, the setpoint could have any suitable value. For example, when expressed as an error rate, the setpoint could have values such as 1.5%, 3.0%, or 4.6%. As another example, when expressed as an error count within a sliding window of 64 messages, the setpoint could have values such as one, two, or three messages.

The quantizer 268 uses these inputs to generate a TPC code. For example, the quantizer 268 could generate a two-bit TPC code based on the extent of the difference between an actual error rate, error count, or signal strength and the setpoint. As a particular example, the two-bit TPC code could be generated as shown in Table 3.

TABLE 3

| | Actual Error Rate | | | | | | | | |
|---|---|---|---|---|---|---|---|---|---|
| SP | 0.0% | 1.6% | 3.1% | 4.7% | 6.3% | 7.8% | 9.4% | 10.9% | 12.5% |
| 4.6% | 11 | 11 | 11 | 10 | 01 | 00 | 00 | 00 | 00 |
| 3.0% | 11 | 11 | 10 | 01 | 00 | 00 | 00 | 00 | 00 |
| 1.5% | 11 | 10 | 01 | 00 | 00 | 00 | 00 | 00 | 00 |

In this table, the two-bit TPC code output by the quantizer 268 depends on the actual error rate provided by the error/RSSI calculator 266 and the setpoint. In other embodiments, the quantizer 268 uses error counts (as opposed to error rates) or signal strengths to generate the two-bit TPC code. As a particular example, the two-bit TPC code could be generated as shown in Table 4.

TABLE 4

| | Actual Error Count | | | | | | | | |
|---|---|---|---|---|---|---|---|---|---|
| SP | 0 | 1 | 2 | 3 | 4 | 5 | 6 | 7 | 8 |
| 3 | 11 | 11 | 11 | 10 | 01 | 00 | 00 | 00 | 00 |
| 2 | 11 | 11 | 10 | 01 | 00 | 00 | 00 | 00 | 00 |
| 1 | 11 | 10 | 01 | 00 | 00 | 00 | 00 | 00 | 00 |

In this table, the TPC code is based on a difference between the desired or acceptable number of data messages among a window (such as 64 messages) having errors and the actual number of data messages having errors. The quantizer 268 could use any other suitable technique to identify a TPC code for a leaf node. The quantizer 268 includes any suitable hardware, software, firmware, or combination thereof for generating codes associated with transmit powers of a leaf node's transmissions. It may be noted that, in some embodiments, the actual error rate, error count, or signal strength can be provided to a leaf node, and the quantizer 268 can be omitted.

The identified TPC code is provided to a message generator 270. The message generator 270 generates acknowledgements or other messages for a leaf node. For example, when the infrastructure node 250 successfully receives a data message from a leaf node, the infrastructure node 250 can generate and transmit an acknowledgment message. The message generator 270 can include the TPC codes generated by the quantizer 268 in the acknowledgments or other messages. In this way, the infrastructure node 250 very efficiently provides feedback to the leaf nodes (allowing the leaf nodes to adjust their transmit powers accordingly) while sending only two bits of TPC code. In other embodiments, the message generator 270 could receive error rates, error counts, or signal strengths directly from the error/RSSI calculator 266 and include that information in the acknowledgments or other messages. The message generator 270 includes any hardware, software, firmware, or combination thereof generating acknowledgments or other messages containing feedback data.

It may be noted that the infrastructure node 250 could perform these operations for one or multiple leaf nodes, such as for each communication channel (like each frequency) used to communicate with one or multiple leaf nodes. Also, in particular embodiments, when implemented using software or firmware instructions, the amount of code necessary for implementing the transmit power control functionality of the infrastructure node 250 could be small. For example, these instructions could have 1,400 bytes of instructions for the transmit power control functionality, along with a specified amount of variable data values (which could vary depending on the number of leaf nodes) and 30 bytes of constant data values.

Although FIGS. 2A and 2B illustrate examples of wireless nodes in a wireless network, various changes may be made to FIGS. 2A and 2B. For example, various components in each figure could be combined, subdivided, or omitted and additional components could be added according to particular needs. Also, a "wireless node" represents any device that can transmit and/or receive data wirelessly, even if the "wireless node" has the ability to transmit and/or receive data over a wired connection as well.

Figure 3A:
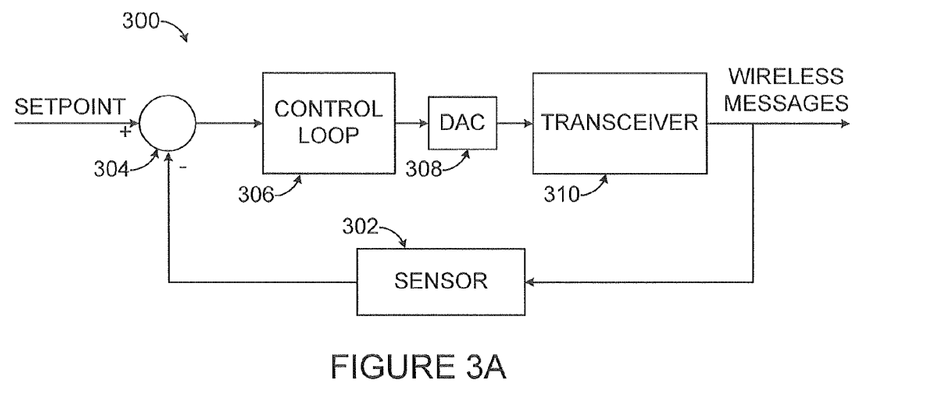
FIGS. 3A and 3B illustrate example mechanisms for transmit power control in a wireless network according to this disclosure.
Figure 3B:
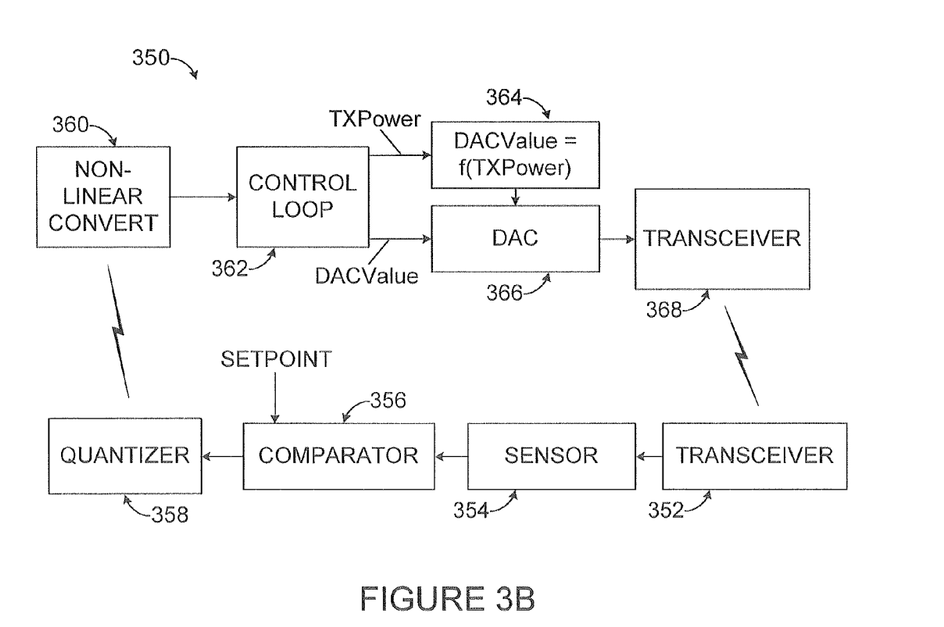

FIGS. 3A and 3B illustrate example mechanisms for transmit power control in a wireless network according to this disclosure. The example mechanisms shown in FIGS. 3A and 3B are for illustration only. Other embodiments of the transmit power control mechanisms could be used without departing from the scope of this disclosure.

FIG. 3A illustrates an example theoretical model 300 for transmit power control. In this example, the model 300 represents the feedback of information from one or more infrastructure nodes, where the feedback is used to control the transmit power of a leaf node. Here, the feedback is provided by a sensor 302, which could represent the error/RSSI calculator 266 in the infrastructure node 250. The sensor 302 measures one or more characteristics of data sent over a wireless channel or of the wireless channel itself. This feedback could take any suitable form, such as a bit error rate, packet error rate, or receive signal strength. The feedback is compared against a setpoint in a comparator 304, such as by comparing the actual error rate, error count, or receive signal strength to a desired error rate, error count, or receive signal strength.

The difference between the actual and desired feedback is provided to a control loop 306. The control loop 306 could implement a PI or PID control loop and could represent some of the functions of the TPC control unit 218. The control loop 306 analyzes the difference between the actual and desired feedback and generates an output based on the analysis. For example, if an actual error rate/count is much higher than a desired error rate/count, the control loop 306 could generate an output for rapidly increasing the transmit power of a node. As another example, if an actual receive signal strength is higher than a desired receive signal strength, the control loop 306 could generate an output for decreasing the transmit power of a node.

As noted above, the control loop 306 could control the transmit power directly, such as by selecting DAC values that correspond to specific transmit powers. The control loop 306 could also operate to control the DAC values, such as by incrementing or decrementing the DAC values by certain amounts. Depending on the implementation of the leaf node 200, control of the DAC values may be preferred to control of the transmit power values, such as when the DAC values are determined using integer calculations and the transmit power values are determined using floating point calculations. In any case, the outputs from the control loop 306 are provided to a DAC 308, which could represent the digital-to-analog converter 213 in the leaf node 200. The DAC 308 produces transmit power values identifying the transmit powers to be used by a transceiver 310, which could represent the transceiver 212 in the leaf node 200.

FIG. 3B illustrates a more specific implementation 350 of the transmit power control model. In this example, an infrastructure node includes a transceiver 352, which could represent a transceiver in the wireless radio 254 of the infrastructure node 250. The transceiver 352 provides data to a sensor 354, which could represent the error/RSSI calculator 266 in the infrastructure node 250. The sensor 354 measures one or more characteristics of data sent over a wireless channel or of the wireless channel itself, such as an error rate, error count, or receive signal strength. This data is provided as feedback to a comparator 356, which compares the feedback to a setpoint. The difference is then quantized by a quantizer 358, which could generate a two-bit TPC code.

The TPC code is transmitted to the leaf node, where a non-linear converter 360 processes the TPC code. The non-linear converter 360 could be implemented in the TPC control unit 218 and can use a non-linear transformation function to assign different values to different TPC codes. This may allow the leaf node 200 to more rapidly increase its transmit power and more slowly decrease its transmit power. These values are provided to a control loop 362, which could also be implemented in the TPC control unit 218. The control loop 362 uses the values from the non-linear converter 360 to generate either transmit power values (TXValues) or DAC values (DACValues). The DAC values can be provided to a DAC 366, while the transmit power values are provided to a function 364 that converts the transmit power values into corresponding DAC values. As noted above, computation of the DAC values could involve only integer calculations, while computation of the transmit power values may involve floating point calculations. The DAC 366 outputs analog values to a transceiver 368, which uses transmit powers based on the analog values.

Although FIGS. 3A and 3B illustrate example mechanisms for transmit power control in a wireless network, various changes may be made to FIGS. 3A and 3B. For example, any other suitable mechanisms containing other or additional components could be used. Also, as noted above, the feedback need not include quantized values, and the quantized values need not be associated with a non-linear transformation function.

Figure 4:
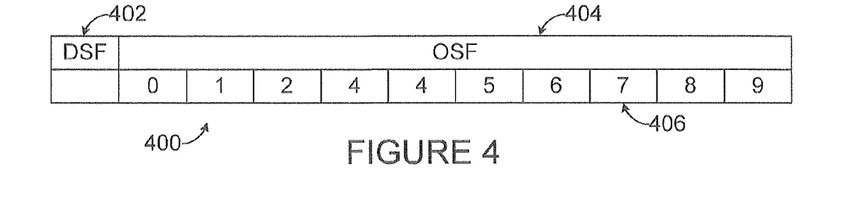
FIG. 4 illustrates an example time slot frame for organizing time-structured wireless communications according to this disclosure.

FIG. 4 illustrates an example time slot frame 400 for organizing time-structured wireless communications according to this disclosure. The embodiment of the frame 400 shown in FIG. 4 is for illustration only. Other embodiments of the frame 400 could be used without departing from the scope of this disclosure.

In some embodiments, communications between nodes in a wireless network could occur as follows. A hyperperiod can be defined as a thirty second (or other) periodic cycle. Within each hyperperiod is a discovery time period (DTP), such as a ten second period. The DTP is subdivided into repeating frames, an example of which is shown in FIG. 4. A frame 400 could, for example, represent a 250 millisecond frame. Within each frame 400 is a discovery subframe (DSF) 402 (which occupies the first 11 milliseconds of the frame 400) and an operation subframe (OSF) 404 (which occupies the remainder of the frame 400). The operation subframe 404 is divided into time slots 406 (such as ten slots).

Nodes engage in various handshaking and other operations during the discovery subframe 402. For example, leaf nodes 110a-110e could broadcast beacon signals during the discovery subframe 402, allowing infrastructure nodes 108a-108e to identify the leaf nodes. This may allow new nodes coming online in the wireless network to identify potential infrastructure nodes that can communicate with the new nodes. The operation subframe 404 then allows the nodes to exchange data being transported through the wireless network, such as sensor data sent from leaf nodes or actuator control signals sent to leaf nodes. During the time slots 406 when data is transmitted from leaf nodes to infrastructure nodes, the first halves of the slots 406 could involve transmissions of the data from the leaf nodes, as well as transmissions of acknowledgement messages sent from the infrastructure nodes to the leaf nodes. The second halves of the slots 406 could involve optional re-transmissions of the data (if the first transmission is not acknowledged).

In the operation subframe 404, some of the slots 406 could represent times when normal data traffic (such as sensor and actuator data) is not sent. Rather, these slots 406 represent times when periodic time synchronization can occur. For example, during these slots, various infrastructure nodes can receive messages containing time synchronization information and transmit messages containing time synchronization information. This allows the infrastructure nodes and other nodes to synchronize to a specific time using the time synchronization information.

In embodiments using the frame 400, only a subset of the transmissions by the leaf nodes 200 may involve adjustable transmit power control. For example, in particular embodiments, only the periodic transmissions of a data message by a leaf node during the first half of a time slot 406 may be controlled by the TPC control unit 218. Other types of messages transmitted by the leaf nodes during the frames 400 (such as retransmissions) could be sent at maximum transmit powers. Of course, any type of message could be transmitted in a wireless network using adjustable transmit power. For instance, data acknowledgements sent by infrastructure nodes could be controlled based on feedback from leaf nodes. In these embodiments, the leaf nodes could include some or all of the components 266-270, and the infrastructure nodes could include some or all of the components 216-218.

Although FIG. 4 illustrates one example of a time slot frame for organizing time-structured wireless communications, various changes may be made to FIG. 4. For example, communications between nodes in a wireless network could involve any other suitable frame structure or protocol. Also, any suitable transmissions could involve the use of the transmit power control functionality described above.

Figure 5:
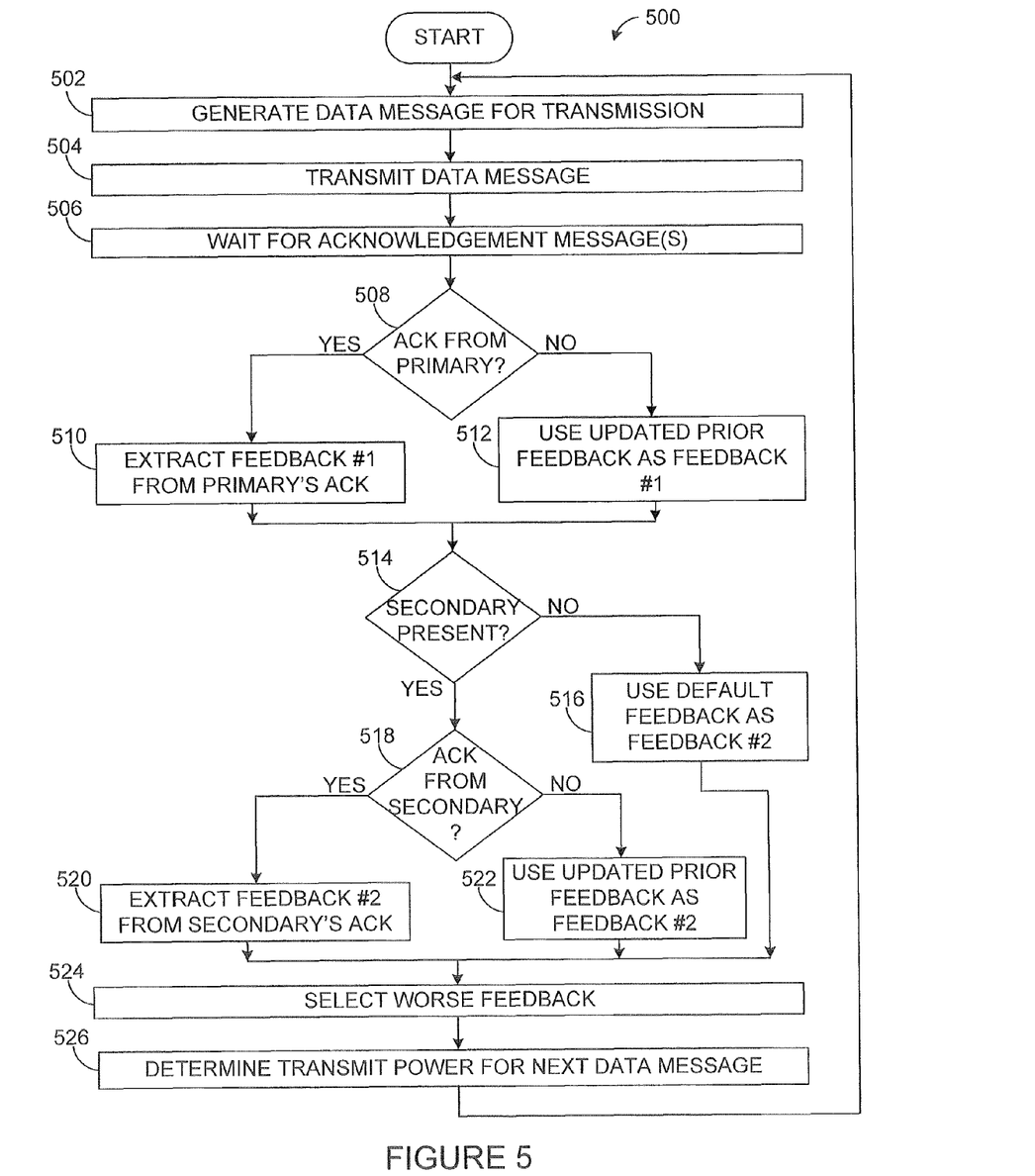
FIGS. 5 and 6 illustrate example methods for transmit power control in a wireless network according to this disclosure.
Figure 6:
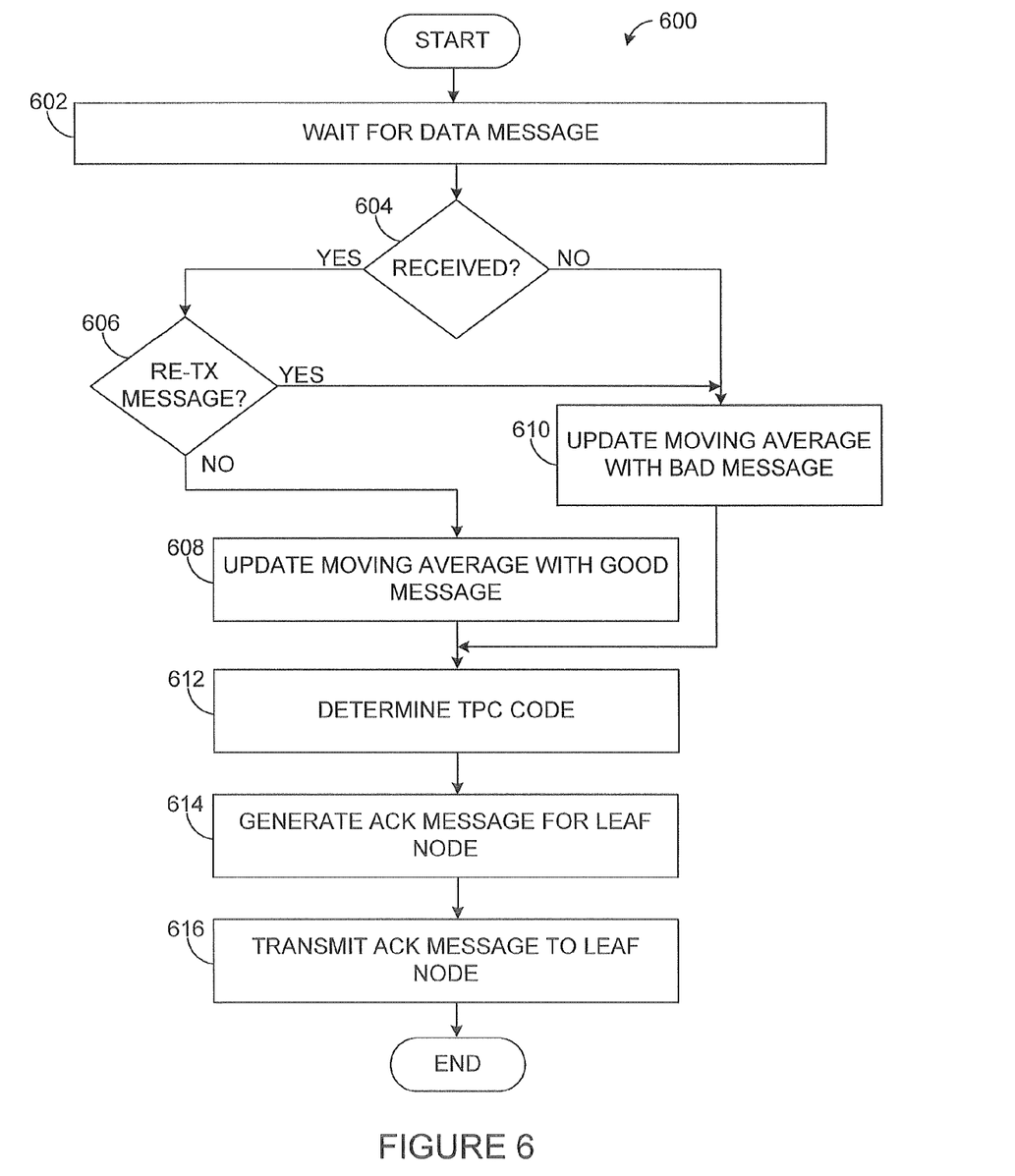

FIGS. 5 and 6 illustrate example methods for transmit power control in a wireless network according to this disclosure. The embodiments of the methods shown in FIGS. 5 and 6 are for illustration only. Other embodiments of the methods could be used without departing from the scope of this disclosure.

In FIG. 5, a method 500 illustrates high-level transmit control functionality of a leaf node, such as leaf node 200. A data message is generated for transmission at step 502. This could include, for example, the controller 206 in the leaf node 200 generating a data message containing sensor data destined for the controller 104. The data message could include any suitable content and be destined for any suitable destination(s). The data message is transmitted at step 504. This could include, for example, the controller 206 providing the data message to the wireless radio 202 in the leaf node 200 for transmission. The transmit power used here could represent a default transmit power (such as a maximum power) or the transmit power determined previously (such as using prior data messages). The leaf node waits for one or more acknowledgements at step 506.

If an acknowledgement is received from the leaf node's primary infrastructure node at step 508, the leaf node extracts first feedback data from the acknowledgement at step 510. The first feedback data could, for example, represent an error rate, error count, or receive signal strength calculated by the leaf node's primary infrastructure node. The first feedback data could also represent a TPC code based on the error rate, error count, or receive signal strength calculated by the primary infrastructure node. If no acknowledgement is received from the leaf node's primary infrastructure node at step 508, the leaf node uses updated prior feedback data as its first feedback data at step 512. This could include, for example, the leaf node 200 decrementing a TPC code previously received from its primary infrastructure node and using the decremented TPC code as the first feedback data. In this case, the prior feedback data (the prior TPC code) is updated to reflect the fact that the current message appears to have been lost.

A determination is made whether the leaf node has a secondary infrastructure node at step 514. This could include, for example, the controller 206 in the leaf node 200 determining whether the leaf node 200 is communicating with a redundant pair of infrastructure nodes. If not, the leaf node uses default feedback data as second feedback data at step 516. This could include, for example, the controller 206 in the leaf node 200 selecting an error rate of 0%, an error count of 0, or a receive signal strength of 100%.

If a secondary infrastructure node is assigned to the leaf node and if an acknowledgement is received from the secondary infrastructure node at step 518, the leaf node extracts second feedback data from the acknowledgement at step 520. The feedback data could, for example, represent an error rate, error count, or receive signal strength calculated by the leaf node's secondary infrastructure node or a TPC code based on that data. If no acknowledgement is received from the leaf node's secondary infrastructure node at step 518, the leaf node uses updated prior feedback data as its second feedback data at step 522. This could include, for example, the leaf node 200 decrementing a TPC code previously received from its secondary infrastructure node and using the decremented TPC code as the second feedback data.

The worse feedback data is selected at step 524. This could include, for example, the selector 216 in the leaf node 200 selecting one of the first and second feedback data. The selected feedback data may generally identify the worse error rate, the worse error count, or the worst signal strength from the infrastructure nodes. A transmit power for the next data message is determined using the selected feedback data at step 526. This could include, for example, the control unit 218 identifying a value assigned to the TPC code selected by the selector 216. This could also include the control unit 218 using the identified value in one or more of the Equations (1)-(6), such as by updating an integral value and computing the transmit power using the most recent value and the updated integral. The leaf node then returns to step 502 to generate a new data message, which is then transmitted using the determined transmit power.

In FIG. 6, a method 600 illustrates high-level transmit control functionality of an infrastructure node, such as infrastructure node 250. The infrastructure node waits to receive a data message at step 602. This could include, for example, the infrastructure node 250 waiting to receive a data message from a leaf node in a time slot 406 assigned to that leaf node.

If a message is received at step 604, the infrastructure node determines whether it is the re-transmission of a previously-transmitted data message at step 606. This could include, for example, the controller 262 in the infrastructure node 250 determining whether the received data message occurred during the latter half of the time slot 406. If the received message is not a retransmitted message, the infrastructure node updates its moving average with the data message at step 608. This could include, for example, the error/RSSI calculator 266 in the infrastructure node 250 determining the bit error rate or packet error rate for a sliding time window that includes the most recent data message. If a message is not received at step 604 or a received message is the re-transmission of a previously-transmitted data message at step 606, the infrastructure node updates its moving average with a bad data message at step 610. In either case, the first message transmitted during the first half of a time slot 406 was not successfully received.

The infrastructure node determines a TPC code for the leaf node at step 612. This could include, for example, determining the TPC code based on the updated moving average for the sliding time window. As a particular example, this could include the quantizer 268 using the contents of Table 3 or Table 4 to generate a two-bit TPC code.

An acknowledgement message for the leaf node is generated at step 614, and the message is transmitted to the leaf node at step 616. This could include, for example, the message generator 270 in the infrastructure node 250 generating an acknowledgement message containing the identified TPC code. In this way, the infrastructure node 250 provides feedback to a leaf node, allowing the leaf node to alter its transmit power accordingly.

Although FIGS. 5 and 6 illustrate examples of methods for transmit power control in a wireless network, various changes may be made to FIGS. 5 and 6. For example, FIG. 5 assumes that a leaf node could have one or two infrastructure nodes receiving its communications. When the leaf node communicates with one infrastructure node, steps 514-524 could be omitted. The leaf node could also communicate with and receive feedback from more than two infrastructure nodes. As another example, FIG. 6 excludes the re-transmission of a data message from the sliding integral error measurement since it is assumed that the re-transmission occurs at the leaf node's full transmit power. Other embodiments could also be used, such as when the leaf node re-transmits a data message at less than full power. Further, FIG. 6 illustrates the identification of a TPC code, although the actual error rate, error count, or receive signal strength could be provided to the leaf node (and step 612 could be omitted). Beyond that, feedback could be sent to a leaf node in messages other than acknowledgement messages. In addition, while shown as a series of steps, various steps in each figure could overlap, occur in parallel, occur multiple times, or occur in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

repeatedly transmitting messages from a first wireless node at a transmit power;

receiving feedback from a second wireless node, the feedback based on a quality of reception of at least some of the messages at the second wireless node; and adjusting the transmit power of the first wireless node based on the feedback to maintain the quality of reception proximate to a setpoint;

wherein the feedback comprises quantized values; and wherein adjusting the transmit power comprises:

identifying numerical values associated with at least some of the quantized values, including a numerical value associated with a most recently transmitted message;

integrating the numerical values associated with multiple messages; and adjusting the transmit power based on the numerical value associated with the most recently transmitted message and the integrated numerical values.

2. The method of claim 1, wherein:

receiving the feedback comprises receiving feedback from multiple second wireless nodes; and adjusting the transmit power comprises adjusting the transmit power based on the feedback from at least one of the second wireless nodes.

3. The method of claim 1, wherein:

the messages are transmitted on multiple wireless channels;

receiving the feedback comprises receiving feedback for each wireless channel based on the quality of reception for that wireless channel; and adjusting the transmit power comprises adjusting the transmit power for each wireless channel based on the feedback for that wireless channel.

4. The method of claim 1, wherein adjusting the transmit power comprises identifying a transmit power value based on the numerical value associated with the most recently transmitted message and the integrated numerical values.

5. The method of claim 1, wherein:

the first wireless node comprises a digital-to-analog converter and a power amplifier, the transmit power based on an amount of amplification provided by the power amplifier, the amount of amplification controlled by the digital-to-analog converter; and adjusting the transmit power comprises:

identifying a digital value based on the numerical value associated with the most recently transmitted message and the integrated numerical values; and providing the digital value to the digital-to-analog converter.

6. The method of claim 5, wherein identifying the digital value comprises:
determining the digital value using a non-linear transformation function, the non-linear transformation function transforming the quantized values into non-linear numerical values allowing for more rapid increases in the transmit power and less rapid decreases in the transmit power.

7. The method of claim 5, wherein each quantized value has one of at least four states, the at least four states including states that indicate:
the quality of reception is better than the setpoint;
the quality of reception is acceptable compared to the setpoint;
the quality of reception is worse than the setpoint; and
the quality of reception is much worse than the setpoint.

8. The method of claim 1, wherein adjusting the transmit power of the first wireless node minimizes the transmit power while maintaining the quality of reception proximate to the setpoint.

9. The method of claim 1, further comprising:
re-transmitting at least one of the messages not successfully received by the second wireless node, wherein the re-transmission occurs using an increased transmit power that is not based on the feedback.

10. The method of claim 1, wherein the quality of reception comprises at least one of: a bit error rate, a packet error rate, and a receive signal strength.

11. The method of claim 1, wherein the quality of reception is determined for a sliding window associated with a subset of the transmitted messages.

12. An apparatus comprising:
a wireless radio configured to repeatedly transmit messages at a transmit power, the wireless radio also configured to receive feedback from a receiving node, the feedback based on a quality of reception of at least some of the messages at the receiving node; and
a controller configured to adjust the transmit power of the wireless radio based on the feedback to maintain the quality of reception proximate to a setpoint;
wherein the feedback comprises quantized values; and
wherein the controller is configured to adjust the transmit power by:
identifying numerical values associated with at least some of the quantized values, including a numerical value associated with a most recently transmitted message;
integrating the numerical values associated with multiple messages; and
adjusting the transmit power based on the numerical value associated with the most recently transmitted message and the integrated numerical values.

13. The apparatus of claim 12, wherein the controller comprises a proportional-integral controller or a proportional-integral-derivative controller.

14. The apparatus of claim 12, wherein:
the feedback comprises feedback from multiple receiving nodes; and
the controller is further configured to select the feedback from one of the receiving nodes, the controller configured to adjust the transmit power based on the selected feedback.

15. The apparatus of claim 12, wherein the controller is configured to adjust the transmit power by identifying a transmit power value based on the numerical value associated with the most recently transmitted message and the integrated numerical values.

16. The apparatus of claim 12, wherein:
the wireless radio comprises a digital-to-analog converter and a power amplifier, the transmit power based on an amount of amplification provided by the power amplifier, the amount of amplification controlled by the digital-to-analog converter; and
the controller is configured to adjust the transmit power by:
identifying a digital value based on the numerical value associated with the most recently transmitted message and the integrated numerical values; and
providing the digital value to the digital-to-analog converter.

17. The apparatus of claim 16, wherein the controller is configured to identify the digital value by:
determining the digital value using a non-linear transformation function, the non-linear transformation function transforming the quantized values into non-linear numerical values allowing for more rapid increases in the transmit power and less rapid decreases in the transmit power.

18. The apparatus of claim 16, wherein each quantized value has one of at least four states, the at least four states including states that indicate:
the quality of reception is better than the setpoint;
the quality of reception is acceptable compared to the setpoint;
the quality of reception is worse than the setpoint; and
the quality of reception is much worse than the setpoint.

19. A tangible computer readable storage medium embodying a computer program, the computer program comprising:
computer readable program code for initiating repeated transmission of messages from a first wireless node at a transmit power;
computer readable program code for obtaining feedback from a second wireless node, the feedback based on a quality of reception of at least some of the messages at the second wireless node; and
computer readable program code for adjusting the transmit power of the first wireless node based on the feedback to maintain the quality of reception proximate to a setpoint;
wherein the feedback comprises quantized values; and
wherein the computer readable program code for adjusting the transmit power comprises:
computer readable program code for identifying numerical values associated with at least some of the quantized values, including a numerical value associated with a most recently transmitted message;
computer readable program code for integrating the numerical values associated with multiple messages; and
computer readable program code for adjusting the transmit power based on the numerical value associated with the most recently transmitted message and the integrated numerical values.

20. The computer readable storage medium of claim 19, wherein the computer readable program code for adjusting the transmit power comprises:
computer readable program code for identifying a transmit power value based on the numerical value associated with the most recently transmitted message and the integrated numerical values.

21. The computer readable storage medium of claim 19, wherein the computer readable program code for adjusting the transmit power comprises:

computer readable program code for identifying a digital value based on the numerical value associated with the most recently transmitted message and the integrated numerical values; and     computer readable program code for providing the digital value to a digital-to-analog converter that is configured to control an amount of amplification provided by a power amplifier.

\* \* \* \* \*